Sept. 29, 1931.      P. SISCO      1,824,796
CONFECTION FORMING MACHINE
Filed March 21, 1929      3 Sheets-Sheet 3
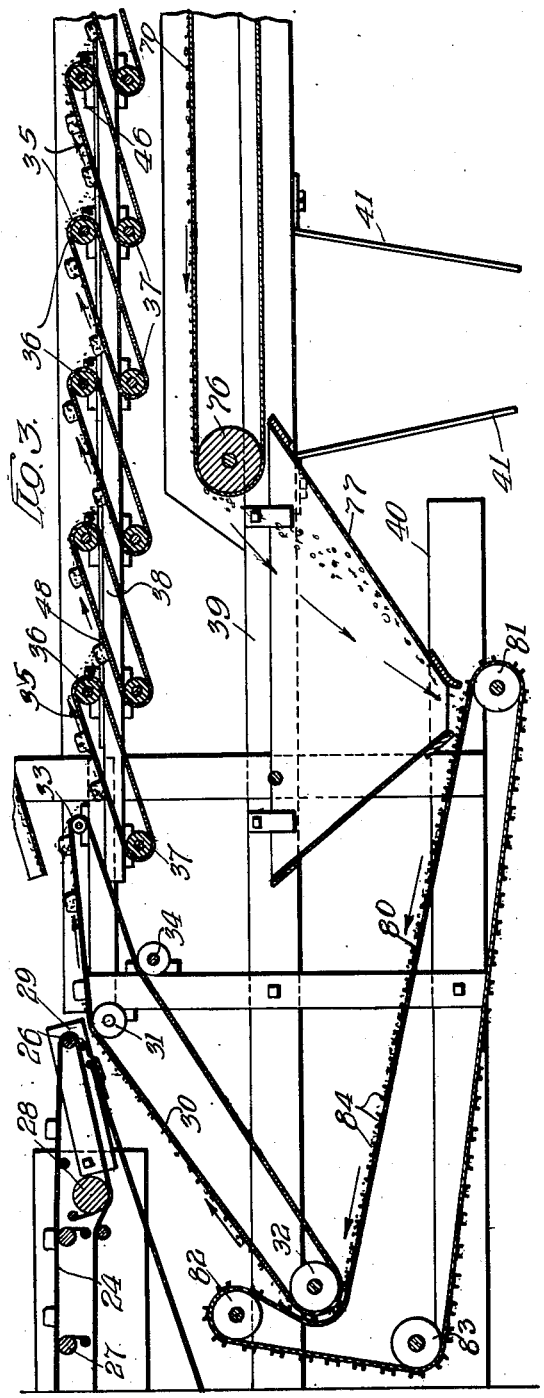
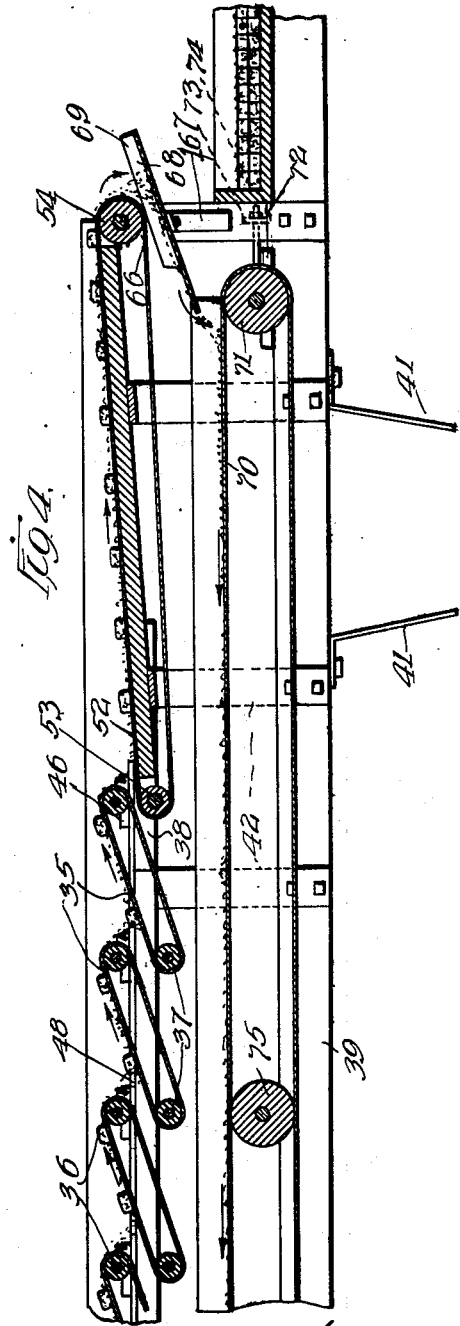
Witness:
Harry R. L. White
Inventor:
Peter Sisco.
By Patented Sept. 29, 1931

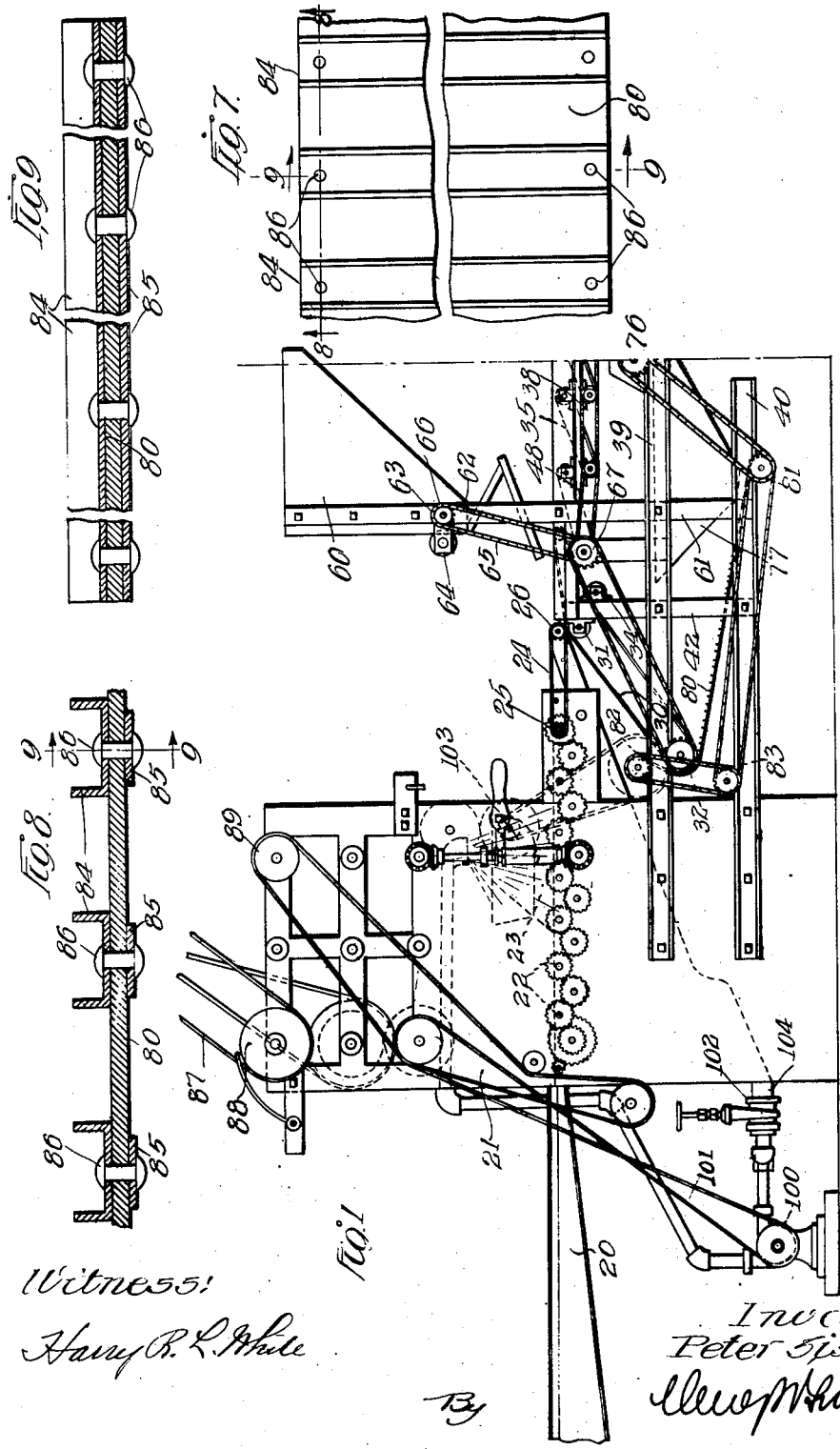

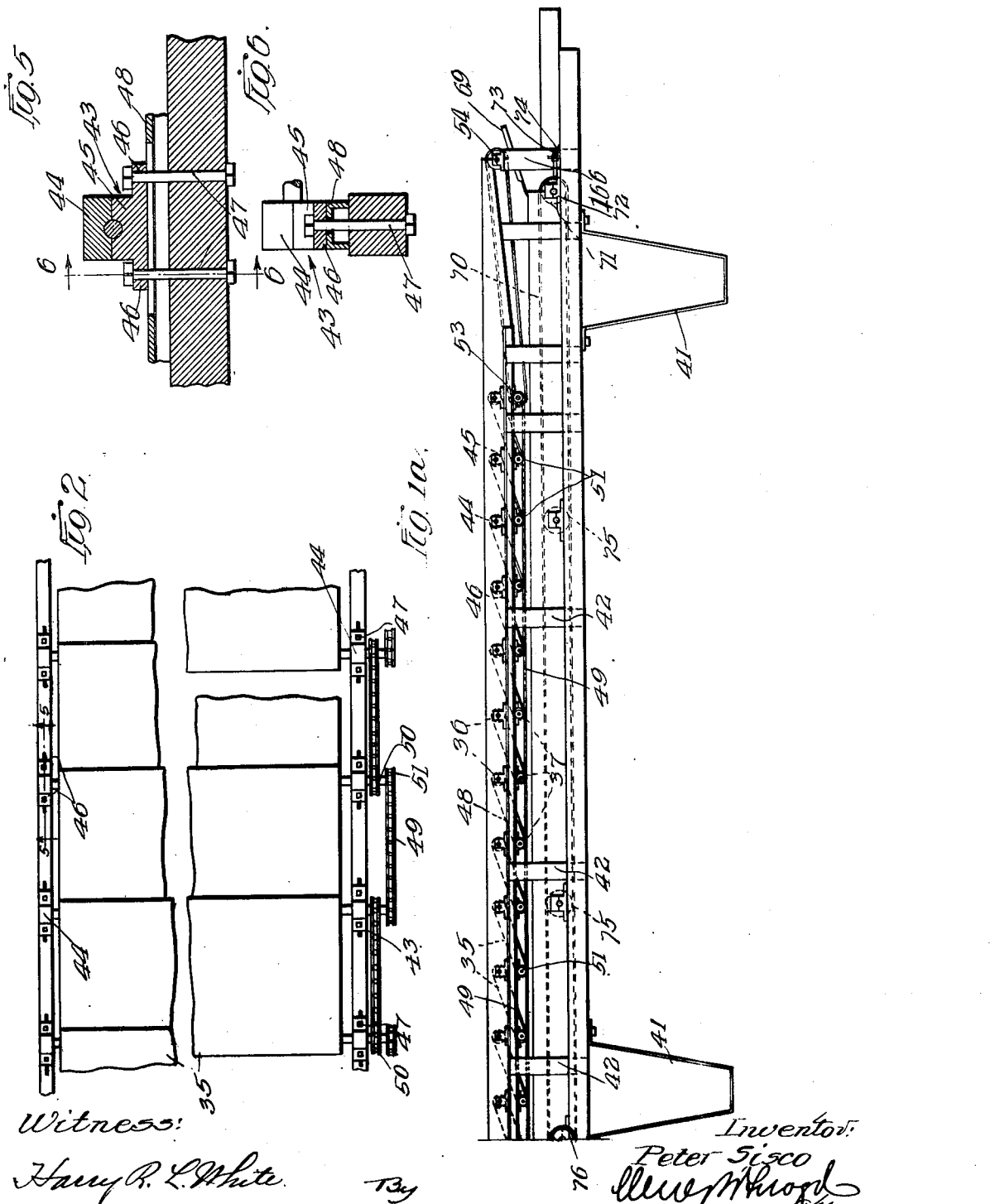

1,824,796

UNITED STATES PATENT OFFICE

PETER SISCO, OF CHICAGO, ILLINOIS

CONFECTION FORMING MACHINE

Application filed March 21, 1929. Serial No. 348,802.

The present invention relates to a candy producing apparatus, and has particularly to do with an improved mechanism for applying a coating of such items as peanuts, shredded cocoanut, and other material in small form or division.

At the present time, a great many of the confections which are produced and which have a large sale, comprise a confection center, and a confection coating about such a center, there being peanuts, broken or whole cocoanut, and other materials secured to the outside of such confection by adhesion or imbedding in such coating.

This necessitates the application of the peanuts, cocoanut, and the like, to the confection while the most external of the other material thereof is still in a soft or moulten condition. That generally means that the peanuts or other substances are applied while at least a part of the confection is still heated.

One of the great difficulties in making confections such as have been briefly described has been an inability to procure an even distribution of a nut, cocoanut or other material to be adhesively applied. Where mechanical methods have been employed, the waste has been so tremendous that nothing in production cost has been gained over hand dipping and coating operations. Until, so far as the applicant is informed, the present invention was conceived and reduced to practice, all mechanical methods were failures for a commercial or production point of view.

The objects of the invention, therefore, include among others, the following:

An improved confection making machine having means for obtaining an even distribution of granular materials over confections.

An unique conveyer system adapted to collect materials, such as peanuts, cocoanut and the like, and employed for applying a coating to a confection, whereby to return such materials to the coating section through which such materials may again be carried to the conveyor system and returned, again and again, until affixed to a confection.

Means for obtaining uniformity in the distribution of materials intended to be adhesively applied to confections.

An improved return conveyer system.

An improved confection tumbler system whereby such confections may be uniformly coated with materials like peanuts, shredded cocoanut, or other granular substances.

These objects, and such other objects as may hereinafter appear, are obtained by the novel construction, unique combination, and improved arrangement of the several elements constituting the single form of the invention illustrated in the accompanying three sheets of drawings, hereby made a part of this specification, and in which:—

Figure 1 is a side elevation of an enrobing machine particularly adapted to be used in conjunction with the conveying device herein described, such conveying device being shown in part and said enrober being more or less schematic in illustration:

Figure 1A is a continuation of Figure 1, and shows the general outline, in elevation, of the tumbling and conveyor mechanism;

Figure 2 is a fragmentary plan view of the tumbling belts.

Figure 3 is a longitudinal section schematically showing the arrangement for obtaining a tumbling action for confections and the return of confection coating material;

Figure 4 is a continuation of Figure 3 and illustrates the discharge end of the apparatus;

Figure 5 is a vertical section through a bearing block for one of the tumbling conveyors on the line 5—5 of Figure 2;

Figure 6 is a vertical section through said block on the line 6—6 of Figure 5;

Figure 7 is a fragmentary plan view of the elevating return belt;

Figure 8 is a longitudinal section of said belt taken on the line 8—8 of Figure 7; and Figure 9 is a transverse section taken on the line 9—9 of Figure 8.

Like reference characters are used to designate similar parts in the drawings and in the specification which follows:

The drawings should be arranged so that Figures 1 and 1A abut. By this means, the complete equipment for manufacturing a cocoanut or peanut coated bar such as are now frequently met in the market by machinery is disclosed. After the making of a candy center the entire production of the remainder of the bar is mechanical and continuous in the present apparatus.

Said confection centers, when made, are laid upon a table 20, whence they are conveyed manually or otherwise, inwardly of an enrober, generally designated 21, where the confections are first "bottomed", and subsequently coated or overcoated in the manner usually followed in enrobing devices.

The enrobing machine 21 is shown more or less schematically, there being a plurality of rollers 22 as is usual therein for advancing the confection cores, and suitably driven, a means for circulating coating material thereabout 23, and an arrangement for pouring the coating material over the centers or cores as they pass through the apparatus.

The belt system for operating the rollers 22, together with the conveyers to be described, and for supplying power to a pump circulating the coating material through the enrober is illustrated in slight detail.

After the enrobing of the cores is completed, the material so applied being any suitable material adapted to congeal on cooling such a chocolate, forms of caramel, and the like, the confections are conveyed outwardly of the enrober at the opposite side from the feed table 20 upon a conveyer, such conveyer comprising an endless belt adapted to be driven about two rollers 25 and 26, there being a plurality of intermediate rollers 27 and 28 for obtaining changes in direction of belt movement and for taking up slack.

At any suitable point in juxtaposition to such conveyer, an electric heating element 29 may be employed, this being for the purpose of maintaining the material with which the center is coated soft and warm so that it will possess, when discharged from the belt 24, high adhesive qualities. This heater is shown schematically in Figure 3.

After the confection is dropped or tumbled from the end of the enrober conveyor, just described, it falls upon an end section of a return conveyor shortly to be more completely described. Said conveyor comprises an endless belt moving about rollers 31, 32, and 33, and guided additionally by an external roller 34.

From such return conveyor 30, the confection is next deposited upon a plurality of parallel, obliquely disposed conveyors 35, each comprising an endless belt intermediate two pulleys 36 and 37. All of these belts 35 are operated at a uniform speed and may be driven by the same prime mover by a suitable belt and pulley later to be described.

As is indicated from Figures 1, 1A and 3, the conveyors and tumbling devices are all adapted to be disposed upon a frame work comprising a plurality of horizontal members, 38, 39 and 40, supported at points intermediate their length by vertical legs 41, there being a plurality of spaced-apart vertical space bars 42 between members 38, 39 and 40, so that a substantially rigid extension projects from the right hand end of the enrobing machine shown in Figure 1.

The number of tumbling belts 35 may be that number desired, and this number depends, of course, upon the character of the confection to be made.

Each tumbler belt 35 is clearly shown in Figures 2 and 3 as supported upon rollers or shafts 36 and 37. Such shafts are disposed in a block 43 comprising an outer and inner member 44 and 45, the inner member having lug extensions 46 to receive machine bolts 47. Such machine bolts are adapted to extend through one of the side frame members 38, and thus secure the blocks in a proper position thereon, one block being disposed at the top of member 38 and the other on the under side. Contiguous belts 35 have their upper and lower bearing blocks in vertical alignment.

As will be noticed from Figure 6, the side frame 38 comprises a substantially rectangular member, generally of wood, and a U-shaped member 48, said U-shaped member having its legs abutting the material of frame 38, the shaft block 45 resting upon its closed side. This construction leads to great strength and rigidity, while keeping the weight of the side members at a low minimum.

The belts 49 for driving the various tumbler belts 35 are associated one with another in the manner shown in Figure 2. Shafts 36 each carry two pulleys 50 and 51, the former being on the inside. The belts 49 are arranged in alternate order, one being between pulleys 50 and the next between pulleys 51. A uniform speed is thus obtained for such belts 35 and a whole battery thereof may be driven by a single actuating element or prime mover.

When the confections have passed over all of the tumblers 35, the action of each tumbler being to receive the confection and to convey it onwardly and upwardly thereover and deposit it to the next adjacent conveyor belt 35 conjointly tumbling it upside down, the confections are dropped upon an elongated conveyor belt 52 to be carried to the packers. Belt 52 moves about rollers 53 and 54.

Such discharge belt 52 may be of any suitable length. The confection may be deposited upon a cooling belt, to permit of it cooling after having passed through the tumbling devices and before being discharged upon a discharge belt. This discharge belt, not shown, may be of any desired length to permit of the cooled confections being picked up by hand packers and packed in boxes or otherwise.

As is shown in Figure 1, at one end of the return belt 30 is a hopper 60. This is disposed upon a standard 61, and it has a mouth 62 which is adapted to be opened mechanically or manually. Schematic means for operating the closure mouth mechanically are shown in Figure 1, and comprise levers or links 63 and 64 in conjunction with a belt 65 about pulleys 66 and 67, the former being driven by the same prime mover as belts 35.

Such an arrangement permits of a substantially even flow of materials such as peanuts, whole or broken, cocoanut shreds, or similar articles from the hopper 60 to the return belt 30 where the granular material so discharged comes into contact with the still warm and highly adhesive solid coating material over the confections or confection centers. The discharge from mouth 62 should be transversely of belt 30 and as evenly distributed thereacross as mechanical means permit.

All of the material which is fed from the hopper 60 onto the tumbler belt 30 is not absorbed by the confections which are placed upon said return belt by the enrober and coated by a rolling motion of the confection over the tumbler belts 35 on to which the unabsorbed material is discharged in seriatim.

In fact, the greater portion of the granular material is not caused to adhere to the confection and passes on to the end of the device where it is discharged on the cooling conveyor, 52.

As the confections reach the end of the cooling conveyor 52, they may be picked off by hand and deposited in a convenient packing box or passed on to a packing belt, not shown, but which may be disposed just therebeneath and which is adapted to rest upon the frame members supporting the tumbling apparatus and cooling belt.

Just beneath the cooling belt 52 adapted to be driven about shaft 53 and 54, and having an undersupporting frame or angle iron 166, upon uprights 167 at the end of the device, is an inclined chute 68 having end walls 69 and into which the granular coating material is deposited as the belt 52 reverses the direction of its movement about pulley 54.

This granular material is adapted to roll down said chute 68 onto a horizontally disposed return belt 70 which return belt at one end is adapted to rotate about a roller 71 mounted upon the horizontal frame member 39, and which has an adjusting bearing block 72, to which bolt 73 threaded in lug 74 is secured, whereby slack in the belt 70 may be taken up.

Intermediate its length said belt 70 has supporting rollers 75 so that the weight of the material thereon and the weight of the belt itself will not produce sagging.

At its other end, see Figure 3, said conveyer belt 70 rotates about roller 76 and is adapted to discharge the material conveyed thereby into a hopper 77 which generally has side members and which is secured at one end to horizontal frame member 39 and at its other end to the horizontal frame member 40.

By passing around rollers 76 and 71, the granular material on the belt 70 is caused to travel towards the hopper 77 where the belt 70 is again reversed in direction by passing around roller 76.

From said chute 77, such granular material is adapted to be deposited upon a transversely ribbed belt 80, which is adapted to be moved about roller 81, a second roller 82, and a third roller 83. Intermediate rollers 81 and 82 upon its upper surface, said ribbed belt is bowed by movement around an additional roller, i. e., roller 32 about which belt 30 also travels. In fact, belt 80 passes around said roller 32 externally to belt 30.

The steepest incline of travel of belt 80 is between roller 32 and roller 82, and this elevation follows upward travel between roller 81 and roller 32, the former being where the material which is discharged from the main return conveyer 70 is being elevated from hopper 77. At the steepest portion of travel, (from 32 to 82), the material on belt 80 is transferred to belt 30 to be again brought into association with coated confections.

From roller 31 to roller 33, confections are being conveyed with their bottoms resting upon material supplied by the return belts just described, this material being thoroughly distributed thereon by the return belts.

The bottom portion of the confection is first coated from the material deposited by belt 80 on belt 30 after which its upper parts are covered by material dropped from the hopper 60. From belt 30 the confection is tumbled to the belt 35. By the tumbling motion obtained from subsequent dropping from one roller 35 to the next the confection is further coated above, below and on its sides, the confection being several times inverted, coincidentally with it being dropped from one belt 35 to the next succeeding belt 35.

In this manner, all of its sides have an opportunity to contact with the granular coating material selected. The loose and non-adherent material is conjointly shaken off. The agitation to which a confection is subjected prevents it from being loosely coated, and makes it almost obligatory that the granular confection material be firmly secured thereon by the adhesiveness of the liquid coating material employed becoming solid with the granular material imbedded therein rather than by the cohesiveness of the various particles of granular coating material themselves.

As will be noticed from Figures 7, 8 and 9, the return belt 80 comprises a continuous strip of canvas or other material, there being ribs 84 of a U-shape regularly spaced thereover. Beneath each of such U-shaped members 84, there is a strip 85 co-extensive therewith in length. Intermediate the legs of the U-shaped member 84 and said strip 85 are inserted a plurality of rivets 86, so that uniformity in attachment may be secured, and the two metallic strips, one the rib, the other the reenforcing member, may be firmly secured one to another.

Any suitable system of belting for power driving may be employed. In the present instance, the main drive is from an overhead shafting by a belt 87 to a pulley 88, other belts not shown, to a shaft for a pulley 89, and by other pulleys until all moving parts are set into motion. From a pulley actuated by said plurality of belts, the conveyor portion of the apparatus is actuated by the several belts shown clearly in Figure 1. One of these extends downwardly to drive a pulley, which pulley in turn is adapted to drive the main lifting conveyer belt 80, and conjointly drive the return belts 30 and 80.

Another belt extends upwardly and is connected to the end member of the tumbling devices 35, there being intermediate belts to the succeeding tumbler belts whereby all of them are operated from a single pulley at uniform speed. Other belting is provided for driving the short discharge belts from the enrober, and the cooling belt.

Particular attention is directed to belt 80 which in its reversed travel is of sufficient obliqueness or inclination to cause the material deposited thereon from hopper 77 to roll therefrom to the main return conveyer belt 30.

The horizontal return conveyer 70 deposits the returned material in hopper 77, with inclined walls whereby the returned material discharged from the horizontal return belt is allowed to deposit away from the edges of the main return belt 80. The three rollers 81, 82 and 83 about which belt 80 travels, is each mounted upon a shaft, each shaft being journalled at its end in blocks disposed upon the frame members. In its travel, it is adapted to contact with return belt 30, such return belt being the first belt over which the confection passes after it has been discharged from the enrober, and such belt also being the one to initially receive the coating material from the hopper 60. Such hopper is so arranged that the confection as it is moved across a short section of this belt 30 is covered by the material falling through the hopper. The belt itself is covered with coating material in the manner now to be described.

The main conveyer belt 80 is different from the other belts. All of the other belts comprise canvas or similar material and the carrying surfaces thereof move in so nearly horizontal plane that confection material thereon will not be conveyed upwardly. As it is necessary to elevate the return material and to spread it evenly, a different type of belt is provided in respect to the main return belt 80. Over the canvas strip or continuous belting, the transverse slats 84 are arranged to spread evenly the return material deposited thereon.

These ribs 84 are spaced apart a certain distance. The granular material is adapted to fall between the ribs or within the legs thereof. So disposed, the material is conveyed from the mouth of the hopper 77 upwardly to the point where the return belt 80 is adapted to engage and travel with return belt 30, said main return belt at that position being adapted to assume an inverted position whereby the material thereon will be transferred from it by gravity to an obliquely travelling section of the return belt 30 and thereon conveyed upwardly to have confections deposited thereon. The contact between belts 30 and 80 spreads the material evenly over belt 30 as it is discharged from belt 80 without crushing it, because of the protection of ribs 84.

The further travel of the main return belt 80 in contact with belt 30 enforces the discharge of material therefrom, and after such material is all discharged, the belt 80 is reversed to return to hopper 77 for a further load.

The invention in the present application resides particularly in the arrangement of the tumbling mechanisms, and in the arrangement for feeding material to the adhesive bars. In this latter, an essential feature is the return of the excess material to the tumbler rollers to be reapplied to the confection, this being a continuous cycle of operations which provides for the use of a minimum of material, without wastage, and causes the material to be used over and over again until it is finally adhesively applied to one of the confections passing through the conveying or tumbling parts of the apparatus.

In said enrober are suitable means for conveying coating material to the bottoming section of the apparatus, and also for conveying coating material to be spilled over the top of the confection centers after they have been bottomed. This is shown schematically and comprises a pump 100, a suitable conduit 101 therefrom to the bottoming parts and to the overhead coating section, a valve 102, means 103 for releasing the coating material over the tops of the confections, and a return line 104 to the pump 101.

I claim:

1. Means for coating the top and bottom of a confection with granular material comprising a belt adapted to convey such confection, a hopper adapted to spread confection material over a confection thereon, and a return belt adapted to spread the excess material from said hopper upon the surface of said conveyor belt anterior to the deposit of additional confections thereon, in combination with a plurality of tumbling belts adapted to receive the coated confection and the excess material deposited on said conveyor belt, said tumbling belts being arranged to discharge the excess of such material onto said return belt.

2. Means for coating the top and bottom of a confection with granular material comprising a belt adapted to convey such confection, a source of material adapted to spread such granular material over a confection on said conveyor belt, a plurality of tumbling belts adapted to advance the coated confection and the excess material deposited on said conveyor belt, said belts being arranged to tumble the confection from one to another during its progress thereover, and a return instrumentality adapted to distribute the excess material evenly across the surface of said conveyor belt anterior to the deposit of additional confections thereon.

3. Confection producing means including an apparatus for coating centers in combination with an instrumentality for applying granular material to the coated centers, comprising a device for depositing granular material over the coated confection, a plurality of spaced apart endless conveyors arranged obliquely in seriatim and disposed with one end of one above the opposite end of the succeeding conveyor whereby the confection is tumbled from one conveyor to the next succeeding conveyor, and means for returning the excess granular material discharged from said conveyors thereto.

4. Confection producing means including an apparatus for coating confection centers, in combination with an instrumentality for applying granular material to the coated center comprising a device for depositing granular material over the coated confection center, a belt for conveying said center while such material is so deposited, a plurality of spaced apart endless conveyors arranged in seriatim and disposed in overlapping relation whereby the confection is tumbled and the excess of granular material is conveyed from one belt to the next succeeding belt, and means for returning such excess of the granular material to the conveyor belt comprising a pair of belts having a portion of their surfaces constantly in mutual contact.

5. A material returning device for association with a coating apparatus adapted to be used with granular coating material, comprising a belt adapted to receive unused excess material, a slatted belt adapted to receive a charge of such material, there being a hopper to guide the material between said belts, and a confection conveying belt cooperating with said slatted belt to spread the material thereover and to receive the spread material therefrom, there being means for inverting the slatted belt while in juxtaposition to said confection conveying belt.

PETER SISCO.